US012697743B2

(12) United States Patent
Tringali et al.

(10) Patent No.: US 12,697,743 B2
(45) Date of Patent: Aug. 4, 2026

(54) ADJUSTABLE BLADE ASSEMBLY HAVING MAGNETIC TENSIONING

(71) Applicant: Andis Company, Sturtevant, WI (US)

(72) Inventors: Richard J. Tringali, Racine, WI (US); Zachary Fossum, Saint Francis, WI (US); Jassen R. Miller, Trevor, WI (US)

(73) Assignee: Andis Company, Sturtevant, WI (US)

( * ) Notice: Subject to any disclaimer, the term of this patent is extended or adjusted under 35 U.S.C. 154(b) by 278 days.

(21) Appl. No.: 17/936,664

(22) Filed: Sep. 29, 2022

(65) Prior Publication Data

US 2024/0109210 A1 Apr. 4, 2024

(51) Int. Cl.

*B26B 19/06* (2006.01)
*B26B 19/20* (2006.01)
*B26B 19/38* (2006.01)

(52) U.S. Cl.

CPC ............ *B26B 19/06* (2013.01); *B26B 19/205* (2013.01); *B26B 19/3846* (2013.01)

(58) Field of Classification Search

CPC ......... B26B 19/06; B26B 19/28; B26B 19/38; B26B 19/205; B26B 19/3846
USPC ......................................... 30/74, 43.91, 43.7
See application file for complete search history.

(56) References Cited

U.S. PATENT DOCUMENTS 2,611,955 A * 9/1952 Brown .................... B26B 19/06 30/223
4,059,891 A 11/1977 Panagiotoulis
4,989,324 A 2/1991 Andis
7,234,242 B2 6/2007 Yao
8,341,846 B1 1/2013 Holmes
9,943,972 B2 4/2018 Werner
11,731,297 B2 * 8/2023 Ashcroft ............. B26B 19/3886 30/43.7
2007/0107234 A1 5/2007 Yao
2009/0019706 A1 1/2009 Werner et al.
2009/0199413 A1 * 8/2009 Tautscher ................ B26B 19/06 30/243
2013/0219724 A1 8/2013 Werner
2013/0312265 A1 * 11/2013 Wilson .................. B26B 21/225 30/74
2014/0117788 A1 5/2014 Takahashi et al.
2016/0075039 A1 3/2016 Werner
2017/0019044 A1 1/2017 Godlieb et al.

(Continued)

FOREIGN PATENT DOCUMENTS

CN 101432104 5/2009
CN 102909733 2/2013

(Continued)

OTHER PUBLICATIONS https://en.wikipedia.org/wiki/Spring_steel; Aug. 18, 2020.*

(Continued)

*Primary Examiner* — Laura M Lee
(74) *Attorney, Agent, or Firm* — Reinhart Boerner Van Deuren s.c.

(57) ABSTRACT

A hair cutting device or clipper is provided with a magnetic blade assembly. The hair cutting device includes a cutting blade, a stationary blade and a yoke attached to the cutting blade. The yoke and/or cutting blade may be magnetized to create an attractive or repulsive force between the cutting blade and the stationary blade.

17 Claims, 16 Drawing Sheets

(56) References Cited

U.S. PATENT DOCUMENTS

| | | | | |
|---|---|---|---|---|
| 2017/0348865 | A1 | 12/2017 | Werner | |
| 2020/0055205 | A1 | 2/2020 | Werner et al. | |
| 2022/0134587 | A1 | 5/2022 | Hahn et al. | |
| 2022/0402154 | A1* | 12/2022 | Ashcroft | B26B 19/06 |
| 2023/0107628 | A1* | 4/2023 | Tringali | H02K 7/14<br>30/210 |
| 2023/0219246 | A1* | 7/2023 | Xiang | B26B 19/386<br>30/43.92 |
| 2025/0381686 | A1* | 12/2025 | Gross | B26B 19/06 |

FOREIGN PATENT DOCUMENTS

| | | | | | |
|---|---|---|---|---|---|
| CN | 203185375 | | | 9/2013 | |
| CN | 203185375 | U | * | 9/2013 | |
| CN | 104128936 | | | 11/2014 | |
| CN | 204913971 | | | 12/2015 | |
| CN | 106103018 | | | 11/2016 | |
| CN | 108274496 | | | 7/2018 | |
| CN | 108908417 | A | * | 11/2018 | |
| CN | 108972636 | A | * | 12/2018 | B26B 19/06 |
| CN | 208196865 | U | * | 12/2018 | |
| CN | 112566762 | | | 3/2021 | |
| CN | 117001722 | A | * | 11/2023 | B26B 19/3806 |
| CN | 117226892 | A | * | 12/2023 | |
| CN | 117656134 | A | * | 3/2024 | B26B 19/02 |
| EP | 1974875 | | | 10/2008 | |
| KR | 20120005629 | A | * | 1/2012 | B26B 19/06 |
| WO | WO2017/120610 | | | 7/2017 | |
| WO | WO-2017120610 | A2 | * | 7/2017 | B26B 19/06 |

OTHER PUBLICATIONS

International Searching Authority, "International Search Report and Written Opinion," issued in connection with International Patent Application No. PCT/US2019/046656, 13 pages.

Partial Supplementary European Search Report for European Application No. 19850550.5, dated Mar. 18, 2022, 10 pages.

International Search Report and Written Opinion for International Application No. PCT/US2023/033699, dated Jan. 23, 2024, 11 pages.

* cited by examiner

ADJUSTABLE BLADE ASSEMBLY HAVING MAGNETIC TENSIONING

BACKGROUND OF THE INVENTION

The present invention relates generally to the field of hair cutting devices, such as hair clippers or hair trimmers. The present invention relates specifically to a magnetic tensioning assembly configured to provide tension between a reciprocating blade and a stationary blade of the blade assembly.

SUMMARY OF THE INVENTION

One embodiment of the invention relates to a magnetic blade assembly. The magnetic blade assembly includes a stationary blade, a cutting blade, a guide member, and a yoke. The stationary blade includes teeth extending along a first blade edge. The cutting blade includes teeth extending along a second blade edge parallel to the first blade edge. The cutting blade is supported relative to the stationary blade such that the cutting teeth are moveable over the stationary blade to cut hair. The guide member includes a base and a cross-portion. The cross-portion is captured between the stationary blade and the cutting blade. The yoke is coupled to the cutting blade and includes a body and a magnet. The body extends in a parallel direction to the second blade edge and the magnet is coupled to the body of the yoke. The magnet generates a tensioning force between the cutting blade and the stationary blade.

In a specific embodiment, the magnetic blade assembly further includes a metal bar coupled to the yoke. The yoke includes a pair of magnets coupled to the body of the yoke and positioned below the metal bar such that a magnetic circuit is created. One of the pair of magnets includes a first end having a positive pole adjacent to the stationary blade and a second end having a negative pole adjacent to the yoke and the other of the pair of magnets includes a first end having a negative pole adjacent to the stationary blade and a second end having a positive pole adjacent to the yoke.

Another embodiment of the invention relates to a magnetic blade assembly. The magnetic blade assembly includes a first blade, a second blade, a blade guide assembly, and a yoke. The first blade includes teeth extending along a first blade edge. The second blade includes teeth extending along a second blade edge parallel to the first blade edge and the second blade is support relative to the first blade. The blade guide assembly is captured between the first blade and the second blade. The blade guide assembly maintains the relative position of the first blade edge relative to the second blade edge. The blade guide assembly includes a guide member, the guide member includes a base and a cross-portion. The cross-portion is captured between the first blade and the second blade. The cross-portion has a first side facing the first blade and a second side facing the second blade. The yoke is coupled to the second blade. A magnet is positioned between the yoke and the second blade. The magnet generates a tensioning force between the second blade and the first blade.

Another embodiment of the invention relates to a magnetic blade assembly. The magnetic blade assembly includes a first blade, a second blade, a guide member, and a yoke. The first blade includes teeth extending along a first blade edge. The second blade includes teeth extending along a second blade edge parallel to the first blade edge and the second blade is support relative to the first blade. The guide member is positioned between the first blade and the second blade. The yoke is coupled to the second blade and includes a body extending in a direction parallel to the second blade edge. A magnet is coupled to the yoke. At least a portion of the magnet extends through a bore defined within the second blade. The magnet generates a tensioning force between the second blade and the first blade.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
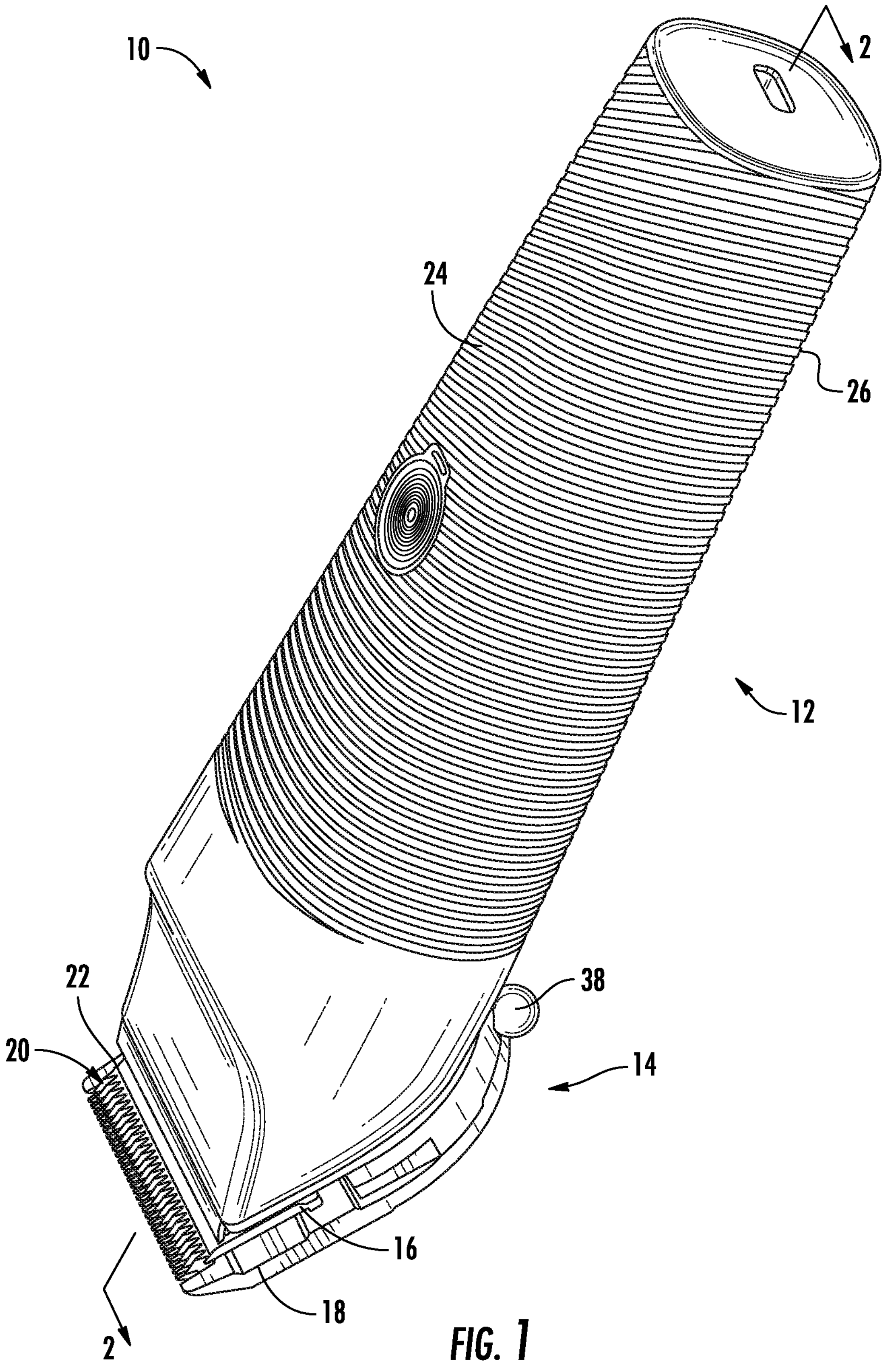
FIG. 1 is a perspective view of a hair cutting device according to an exemplary embodiment.

Referring generally to the figures, various embodiments of a hair cutting device are shown. The hair cutting device includes a blade assembly with an upper or cutting blade supported relative to a lower or stationary blade such that the cutting blade is moveable (i.e., oscillates) relative to the stationary blade. Proper tensioning between the cutting blade and the stationary blade reduces friction on the system, and therefore wear and tear on the blades, and enhances the operational life of the motor. The cutting and stationary blades should be tensioned/pulled together so that the oscillation of the cutting blade does not interfere with the other components of the blade assembly and hair cutting device.

Applicant has found that using a magnetic blade assembly and/or a magnetic force to generate a tensioning force between the cutting and stationary blades allows the tensioning force to be tailored to create the proper tension between the blades to effectively cut hair while also providing a tensioning force which reduces friction between the blades. The reduction of friction between the blades which reduces load on the motor and improves overall efficiency of the system. For example, a yoke positioned above the upper or cutting blade includes magnets or is magnetized creating an attractive force between the blades and reducing the friction of oscillation of the cutting blade. The yoke and/or cutting blade may be magnetized to create a tensioning force (attractive or repulsive) force between the cutting blade and the stationary blade.

Applicant has found the magnetic tensioning systems discussed herein are more uniform than conventional tensioning structures that use springs. The spring tolerances are difficult to control and therefore provide uneven tension across the blade. Similarly, Applicant believes the magnetic tension system provides more consistent tension across the entire length of blade teeth. As previously noted, the magnetic tensioning system or blade assembly reduces friction specifically by reducing fiction by eliminating the spring leg interaction with the yoke body. Applicant has found this reduction in friction can be seen be improved run-time in hair cutters with battery-operated units. Additionally, Applicant believes the magnetic tensioning system provides consistent cut quality throughout the lifetime of the hair cutter blade, unlike spring tensioning systems which are set to a predetermined position, and therefore, provide less tension over time as the blades wear. Finally, the lack of a large spring component that is required for conventional spring tensioning systems frees or opens space around the blade assembly, allowing for a narrower hair cutting device design. This narrower design allows for an improved line of sight for barber's using the hair cutting device.

Applicant believes the magnetic tensioning assemblies described herein provide improved tensioning performance compared to magnetic tensioning assemblies where the magnets or magnetized components are only positioned between the cutting blade and stationary blade. Specifically, when the magnet is only positioned between the blades, Applicant has found the magnets selects or chooses one of the cutting blade and stationary blade over the other blade meaning a constant tensioning force is not applied through the blade assembly. For example, if the magnet were positioned on the guide between the blade, the magnets unevenly bias the guide toward either the cutting or stationary blade and therefore the magnetic tensioning system would not apply a constant tension force through the blade assembly.

Further, Applicant believes the magnetic tensioning assembly discussed herein creates a magnetic system with an improved tensioning performance (i.e., increased magnetic force) compared to magnetic tensioning assemblies that only use magnets and/or a magnetic component. As will be discussed in greater detail below, in a specific embodiment, a pair of magnets positioned with opposing polarities (i.e., one has positive side or pole downward facing towards stationary blade and one has a positive side or pole upward facing toward the yoke) and a metal bar complete a magnetic circuit. Applicant has found the force or tension of the magnetic circuit described herein is greater than a force or tension created by magnets alone.

For ease of discussion and understanding, the following detailed description will refer to and illustrate the blade assembly that incorporates magnetic tensioning with a hair cutting device or hair clipper. It should be appreciated that a hair clipper is provided for purposes of illustration, and the blade assembly disclosed herein can be used in association with any hair cutting, hair trimming, or hair grooming device. Accordingly, the term hair clipper is inclusive, and refers to any hair grooming device including, but not limited to, a hair trimmer, a hair clipper, or any other hair cutting or hair grooming device. The hair clipping device can be suitable for a human, animal, or any other living or inanimate object having hair.

Referring to FIG. 1, a perspective view of a hair cutting device, shown as a hair clipper 10, is shown according to an exemplary embodiment. Hair clipper 10 includes a body or handle 12 and a blade assembly 14. Blade assembly 14 includes a lower or stationary blade 18 and an upper or cutting blade 16 that moves or oscillates to cut hair as cutting teeth 20 of cutting blade 16 move or oscillate over stationary blade 18. Cutting blade 16 has teeth 20 extending from a cutter blade edge 22. In other words, as cutting blade 16 oscillates over stationary blade 18 in the first direction, the teeth 20 on cutting blade 16 and stationary blade 18 capture hair follicles and cooperate to cut hair.

Handle 12 includes an upper housing 24 and a lower housing 26. In various embodiments, handle 12 is a single, continuous, and/or integral part, such that upper housing 24 and lower housing 26 are permanently joined and/or fabricated as an integral continuous component or unitary part. In other embodiments, upper housing 24 is fabricated separately from lower housing 26 and joined or coupled to form handle 12, e.g., using fasteners.

Figure 2:
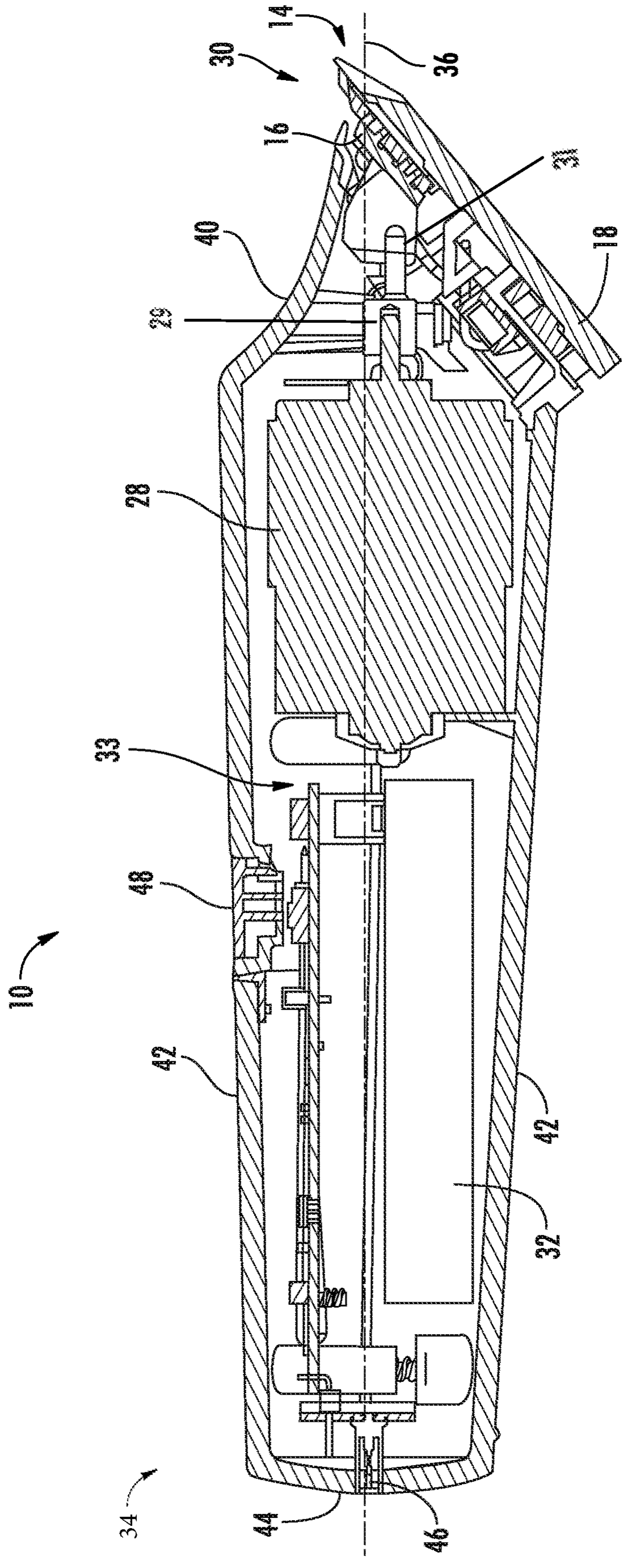
FIG. 2 is a cross-sectional view of the hair cutting device of FIG. 1, taken along line 2-2 in FIG. 1, according to an exemplary embodiment.

Referring to FIG. 2, handle 12 extends along a longitudinal axis 36 and includes a cutting end 30 and a gripping end 34. Blade assembly 14 is positioned at cutting end 30 of hair clipper 10. Gripping end 34 is located longitudinally opposite of cutting end 30. A motor 28 is positioned near the cutting end 30 and is offset by a counterweight provided by an internally housed battery 32 at a gripping end 34 of handle 12. Motor 28 and battery 32 are housed within an internal cavity 33 of handle 12.

In a specific embodiment, motor 28 is a rotary DC electric motor 28. In other embodiments, motor 28 is a pivot motor or a magnetic motor that generates oscillating or reciprocating movement for blade assembly 14. In other embodiments, motor 28 is an AC electric motor or any other suitable motor for generating oscillating or reciprocating movement for a blade assembly 14. As illustrated, motor 28 is configured to operate on battery power (e.g., cordless), but may be configured to operate with electricity from any suitable electric source, e.g., a hair clipper plugged into an outlet.

A drive assembly 29 is positioned within cavity 33 and couples blade assembly 14 to motor 28. A drive shaft 31 is coupled to motor 28 and specifically an output shaft. In a specific embodiment, drive shaft 31 is an eccentric drive shaft 31 that is offset from a motor output shaft. In other words, drive shaft 31 is offset from the axis of rotation of motor 28 such that the drive shaft 31 rotates non-concentrically around the axis of rotation to create an oscillatory rotational motion. Drive shaft 31 is configured to engage a yoke (see e.g., 126 in FIG. 3) of blade assembly 14 and translate or oscillate cutting blade 16 linearly.

A hair shield 40 is formed on an exterior surface 42 of upper housing 24. Hair shield 40 defines a concave depression on a surface of upper housing 24 that prevents cut hair or other debris from entering internal cavity 33 and interfering with motor 28. In other words, hair shield 40 forms a concave hair shield surface that captures and/or deflects hair and other debris away from internal cavity 33 of handle 12. At the gripping end 34 of handle 12, a base 44 of handle 12 has an electric charging port 46. Charging port 46 extends through handle 12 and is electronically coupled to a battery 32 located within internal cavity 33. A power button, shown as circular power button 48 within upper housing 24 electronically couples battery 32 to a control board and selectively controls motor 28, e.g., controls speed and/or powers motor 28 on/off.

Blade assembly 14 includes an adjustment gap assembly, mechanism, or lever 38 (see FIG. 1) that translates cutting blade 16 over the stationary blade 18 in a direction that is transverse to the oscillatory motion of cutting blade 16. Translation of cutting blade 16 in this transverse direction changes the cut-length during operation of hair clipper 10.

FIGS. 3-12 illustrate another embodiment of a blade assembly 114 that can be utilized with a hair cutting device such as hair clipper 10. Blade assembly 114 includes an upper or cutting blade 116 and a lower or stationary blade 116. Blade assembly 114 is substantially the same or similar to the embodiment of blade assembly 14 shown in FIGS. 1-2, except for the differences described herein.

Figure 3:
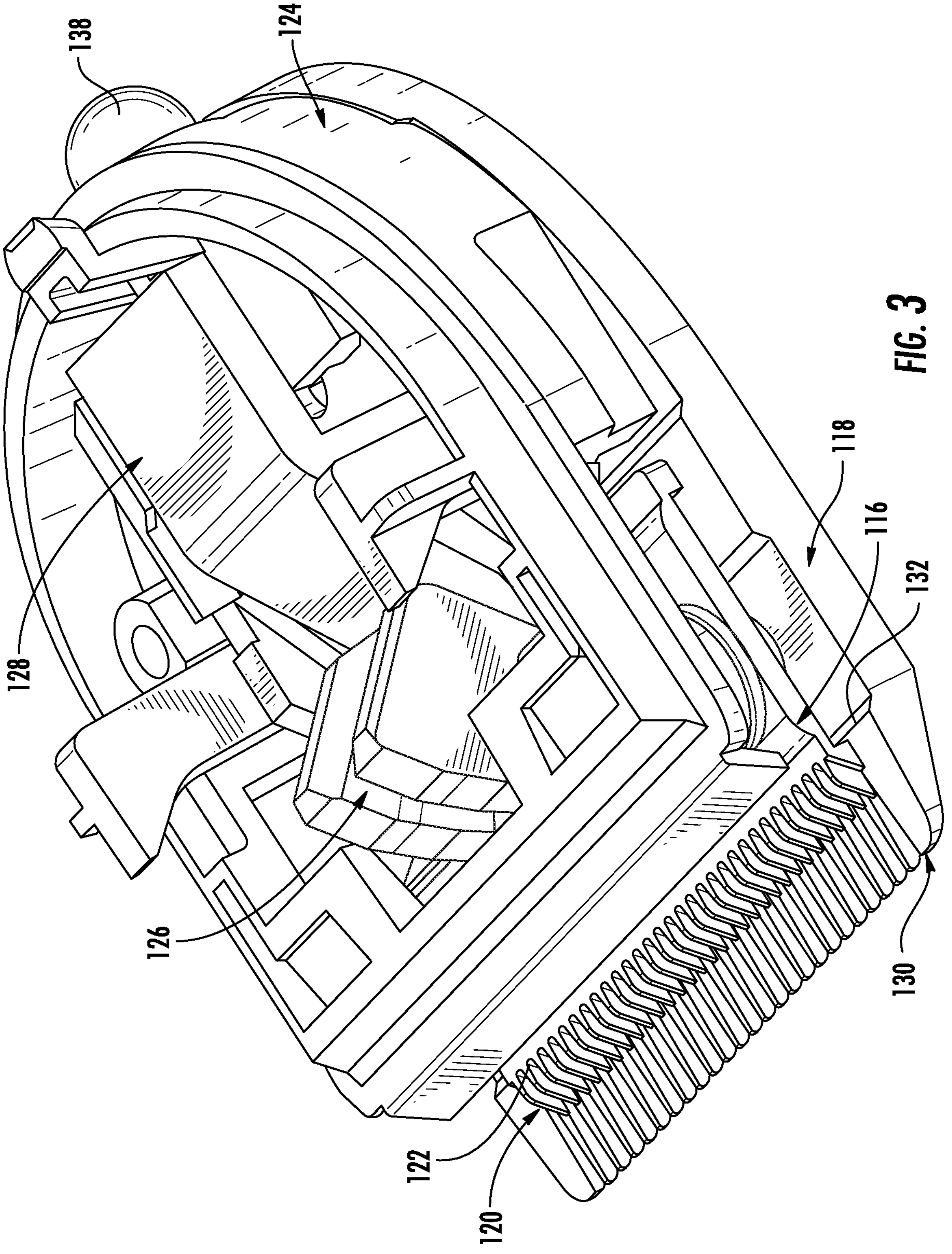
FIG. 3 is a top perspective view of a blade assembly, according to an exemplary embodiment.

FIG. 3 shows a top perspective view of blade assembly 114 is shown, according to an exemplary embodiment. Cutting blade 116 has teeth 120 extending from a cutting blade edge 122 and defining a first direction parallel to a width of the handle (see e.g., 12 in FIG. 1). In other words, as cutting blade 116 oscillates over stationary blade 118 in a first direction, the teeth 120 on cutting blade 116 and blade 118 capture hair follicles and cooperate to cut hair. Stationary blade 118 has stationary teeth 130 extending from a second or stationary blade edge 132.

Figure 4:
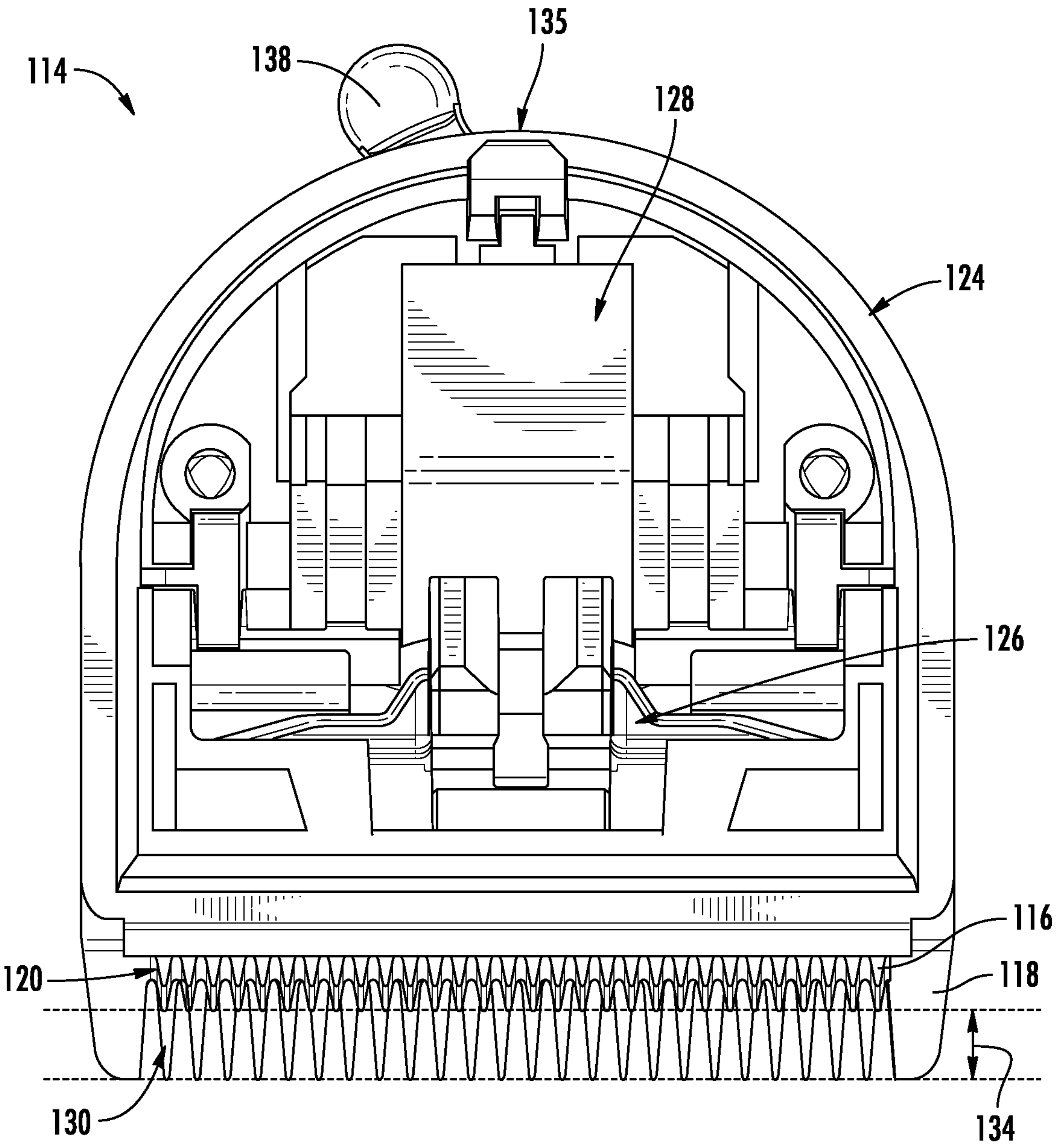
FIG. 4 is a top view of the blade assembly of FIG. 3, according to an exemplary embodiment.

Referring to FIG. 4, a top view of blade assembly 114 is shown, according to an exemplary embodiment. The distance between the imaginary line formed along an outer edge of cutting teeth 120 and the imaginary line formed along the outer edge of stationary teeth 130 is defined as a blade gap 134. An adjustment assembly 135 allows for adjustment of blade gap 134. Adjustment assembly 135 includes lever 138. Movement of lever 138 translates cutting blade 116 relative to stationary blade 118. This translation changes the placement of drive shaft 31 within yoke 126. Yoke 126 is configured to receive drive shaft 31 to oscillate cutting blade 116 at any blade gap 134. In a specific embodiment, three positions or configurations of cutting blade 116 relative to stationary blade 118 can be chosen including "fine," "medium," and "deep" configurations. In various other embodiments, a different number of configurations of the cutting blade 116 relative to stationary blade 118 can be chosen (i.e., 4, 5, 6, etc.).

A blade assembly housing 124 is positioned above (in the orientation shown in FIGS. 3-4) cutting blade 116 and stationary blade 118 and above at least a portion of yoke 126. Adjustment assembly 135 further includes a guide member 128. Guide member 128 couples or connects cutting blade 116 to lever 138. Guide member 128 maintains a position of cutting blade 116 relative to stationary blade 118. In other words, guide member 128 is coupled to and extends between cutting blade 116 and lever 138. Guide member 128 converts movement of lever 138 into translation of cutting blade 116 in a direction that is transverse to the oscillatory motion of cutting blade 116. The motion of lever 138 causes guide member 128 to push or pull cutting blade 116 along a top surface of stationary blade 118. In this way, guide member 128 extends or retracts cutting blade 116 relative to stationary blade 118.

Figure 5:
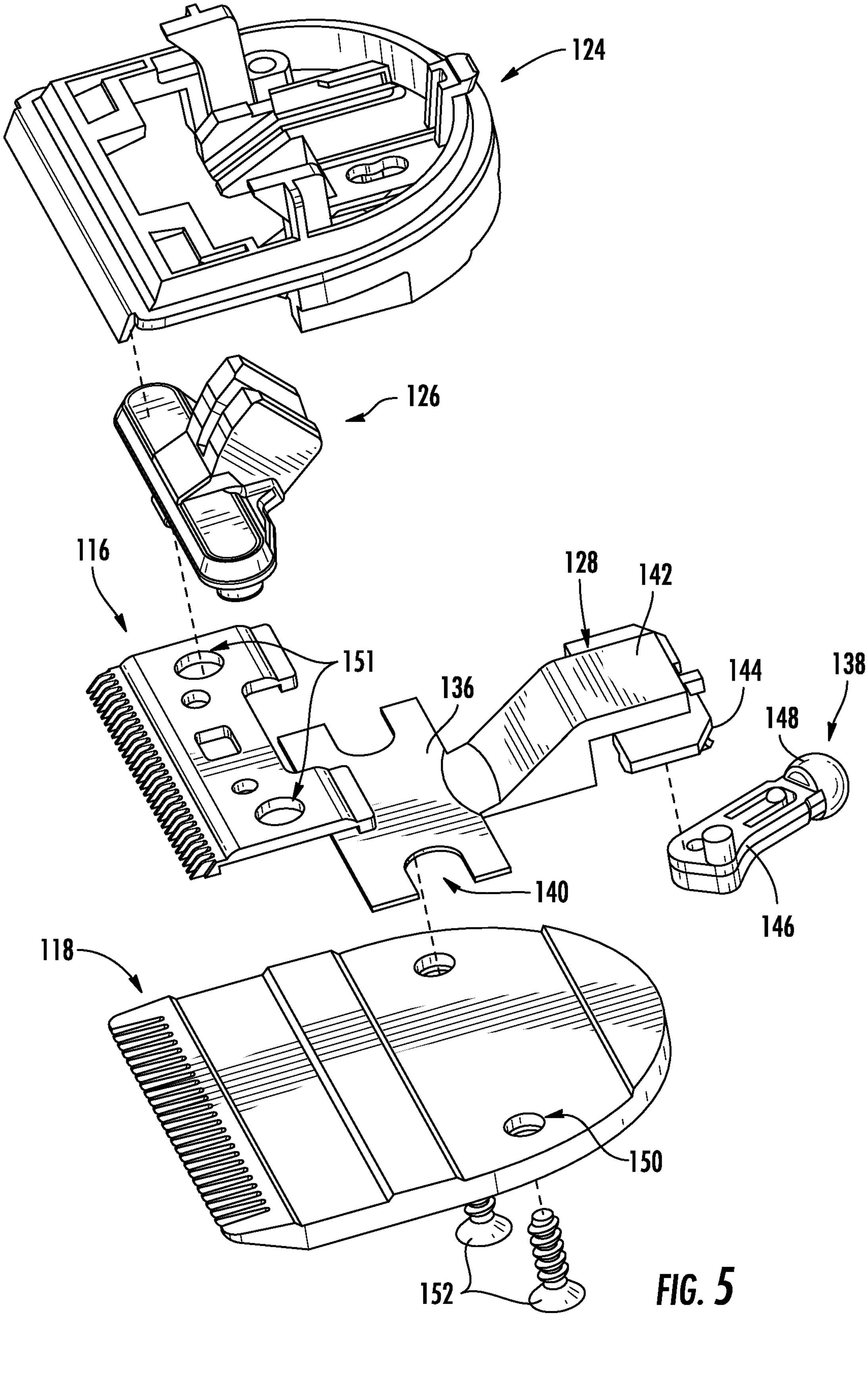
FIG. 5 is an exploded view of the blade assembly of FIG. 3, according to an exemplary embodiment.

FIG. 5 is an exploded view of the blade assembly 114 of FIG. 3, according to an exemplary embodiment. Guide member 128 is positioned between cutting blade 116 and stationary blade 118 when blade assembly 114 is assembled. In a specific embodiment, guide member generally has a T-shape (i.e., cross-portion 136 is generally perpendicular to arm 142). Guide member 128 includes a base, extension body, or arm 142 that connects the sliding translation of a cross-portion or guide rail 136 to a ridge under cutting blade 116. Cross-portion 136 of guide member 128 has a top side adjacent to cutting blade 116 and a bottom side adjacent to stationary blade 118. Arm 142 extends in a generally perpendicular (i.e., 180 degrees plus or minus 10 degrees) direction from the cross-portion 136 and/or the Arm 142 interconnects the cross-portion 136 (captured between upper and lower blades 116 and 118) of guide member 128 to lever 138. Arm 142 includes an angled portion that extends upward (i.e., toward blade assembly housing 124 and away from stationary blade 118). A generally horizontal portion (i.e., approximately planar) of arm 142 of guide member 128 is coupled to a lever connector 144. When assembled, the generally horizontal portion of arm 142 is positioned above at least a portion of blade assembly housing 124. Lever connector 144 is positioned below arm 142 and between guide member 128 and stationary blade 118. Lever 138 includes an extended or elongated body 146 and an actuator 148. A portion of the elongated body 146 of lever 138 engages with the lever connector 144 such that when a user moves the actuator 148 of lever 138 guide member 128 moves. In a specific embodiment, a projection on elongated body 146 extends upward (i.e., towards lever connector 144) and is received within a recess of lever connector 144.

A pair of fastener holes 150 permit fasteners 152 to pass through stationary blade and fixedly couple stationary blade 118 to blade assembly housing 124. Cutting blade 116 includes bores 151 configured to receive a portion of a magnetic tensioning assembly. In a specific embodiment, bores 151 are configured to receive magnets. Similarly, cross-portion 136 of guide assembly 128 includes recesses 140 or cut outs on opposing sides of the cross-portion 136 that extend in a direction perpendicular to cutting blade edge 122. In a specific embodiment, the recesses 140 have a U-shape. When the guide assembly 114 is assembled a portion of a magnetic tensioning assembly such as magnets are positioned within the recesses 140.

Figure 6:
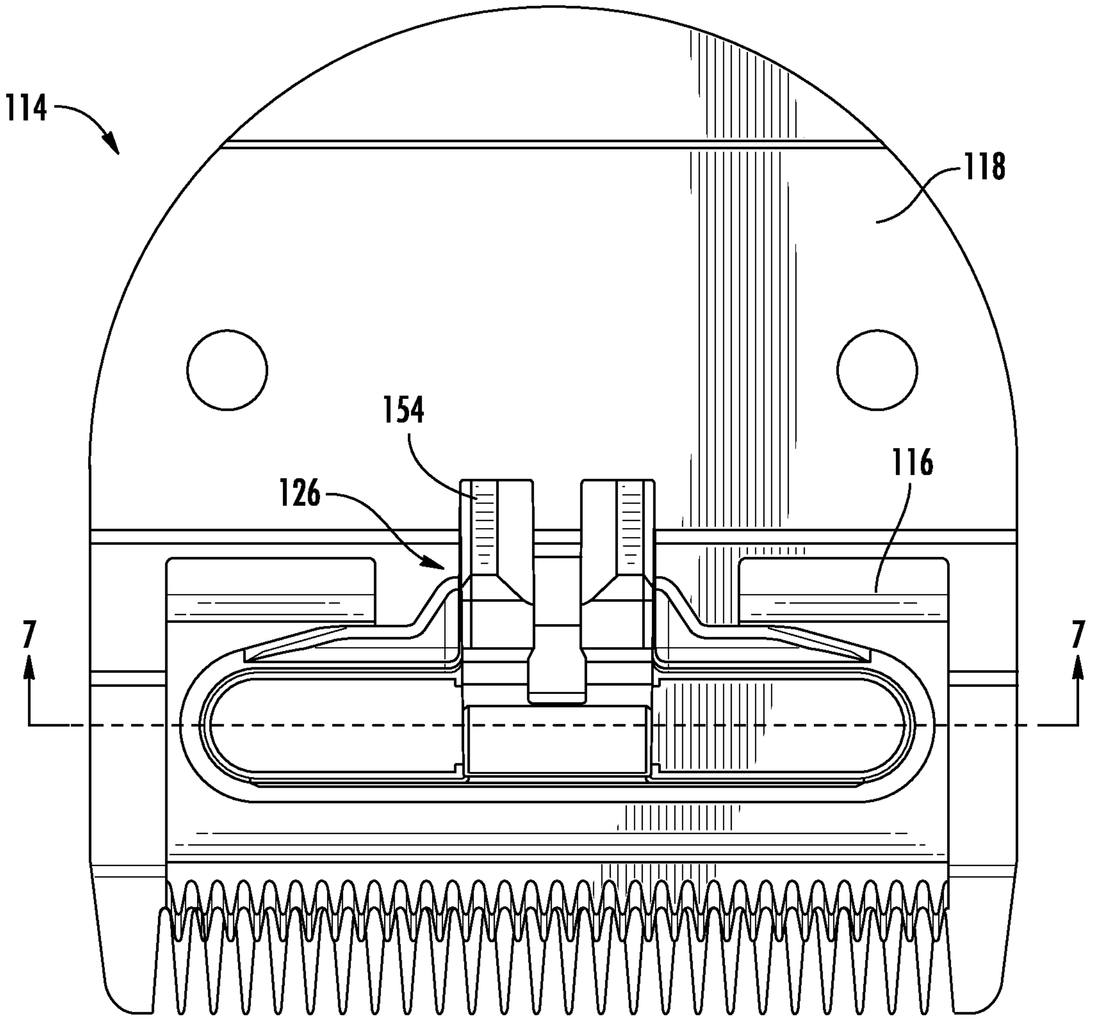
FIG. 6 is a top view of the blade assembly of FIG. 3 with a blade assembly housing and guide member removed, according to an exemplary embodiment.

Referring to FIG. 6, a top view of the blade assembly 114 of FIG. 3 with blade assembly housing 124 and guide member removed, according to an exemplary embodiment. Yoke 126 includes an upper portion 154. Upper portion 154 of yoke 126 is configured to receive a portion of a drive shaft (see e.g., 31 in FIG. 2). Yoke 126 is fixedly coupled to cutting blade 116 and receives motor 28 output through the drive shaft. The movement of the drive shaft causes cutting blade 116 to oscillate over stationary blade 118.

Figure 7:
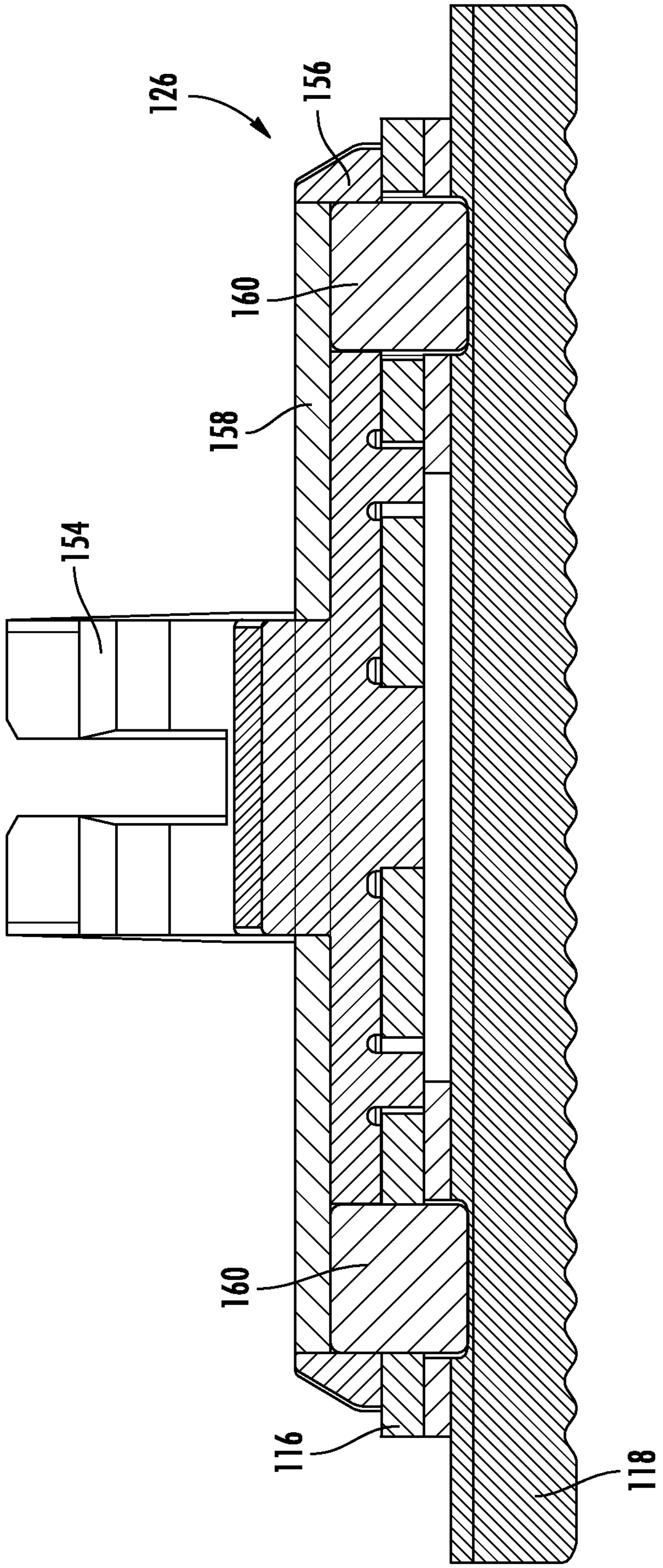
FIG. 7 is a cross-sectional view of the blade assembly of FIG. 3, taken along the line 7-7 in FIG. 6, according to an exemplary embodiment.

FIG. 7 is a cross-sectional view of the blade assembly 114 of FIG. 3, taken along the line 7-7 in FIG. 6 is shown according to an exemplary embodiment. Yoke 126 includes a body or cross-portion 156 extending in a generally parallel orientation to cutting blade edge 122. Yoke 126 further includes a bar, shown as metal bar 158 extending along cross-portion 156. In a specific embodiment, metal bar 158 is formed from a ferromagnetic material such as an iron based metal. In another specific embodiment, metal bar 158 is formed from steel. In another specific embodiment, stationary blade 118 is formed from steel.

Blade assembly 114 includes a magnetized ferromagnetic material and/or at least one magnet 160 positioned between yoke 126 and stationary blade 118. For example, yoke 126 is a non-conductive magnet carrier (e.g., a plastic yoke 126 carrying a magnet 160) or conductive magnetic material. In a specific embodiment, at least one magnet 160 is positioned within and/or coupled to yoke 126 and below metal bar 158. Each magnet 160 includes a first end that is a positive pole and a second end that opposes the first end, the second end is a negative pole. In a specific embodiment a pair of magnets 160 are positioned below metal bar 158. Magnets 160 extend through the cutting blade 116 and specifically bores 151 toward stationary blade 118. In a specific embodiment, magnets 160 are rare earth magnets. In a specific embodiment, the magnets are formed from Neodymium. In such an embodiment, the Neodymium has a grade of N52. In a specific embodiment, magnets 160 have a disc shape. In other embodiments, magnets 160 have a different shape (e.g., polygonal, rectangular, etc.).

As previously discussed, this arrangement creates a magnetic system or circuit with an improved tensioning performance (i.e., increased magnetic force) compared to magnetic tensioning assemblies that only use magnets and/or a magnetic component. When the polarity of magnets 160 are flipped or opposing (i.e., one has positive side downward facing towards stationary blade 118 and one has a positive side upward facing toward the yoke 126) along with metal bar 158 a magnetic circuit is created. In such an arrangement, the positive pole of one magnet 160 is facing and/or adjacent to the stationary blade 118 and the negative pole of the same magnet 160 is facing and/or adjacent to the yoke 126. For the remaining magnet 160, the positive pole of one magnet 160 is facing and/or adjacent to the yoke 126 and the negative pole of the same magnet 160 is facing and/or adjacent to the stationary blade 118.

As will be generally understood, a magnetic circuit is path that contains a magnetic flux generated by a magnet, electromagnet, etc. The magnetic circuit described, creates an attractive or tension force between cutting blade 116 and stationary blade 118. The attractive tensile force maintains the position of cutting blade (up and down) relative to stationary blade 118 during oscillatory reciprocation (e.g., cutting hair).

Figure 8:
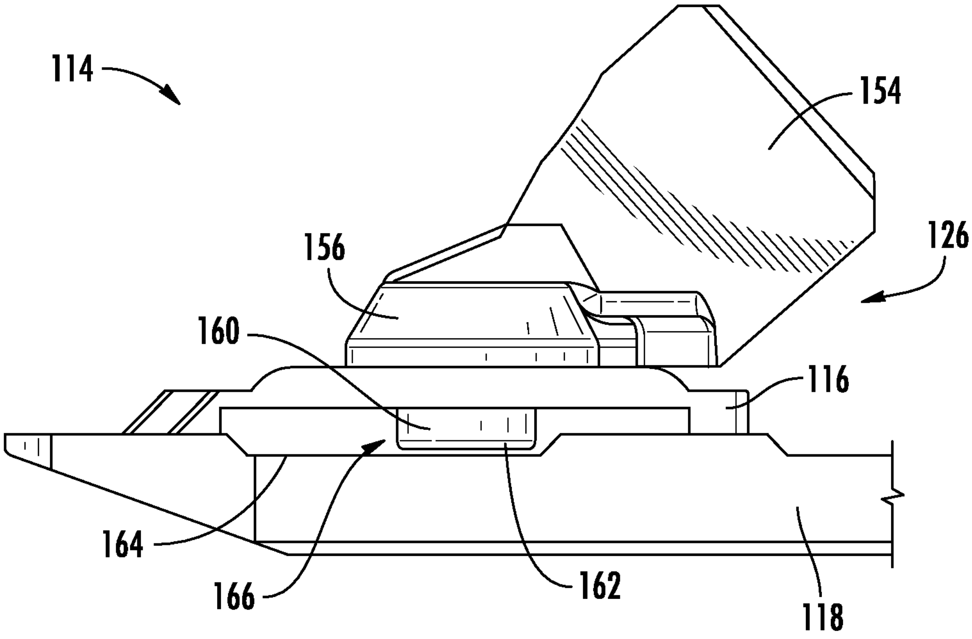
FIG. 8 is a side view of the blade assembly of FIG. 6, according to an exemplary embodiment.

Referring to FIG. 8, a side view of the blade assembly 114 of FIG. 6 is shown, according to an exemplary embodiment. Magnet 160 includes a lower surface 162 that faces an upper surface 164 of stationary blade 118. A gap 166 is defined between lower surface 162 of magnet 160 and upper surface 164 of stationary blade 118. Applicant believes the tensioning force produced reduces friction and/or wear when gap 166 has a dimension or length D. In a specific embodiment, dimension D is between 0.005 and 0.02 inches and more specifically between 0.01 and 0.015 inches.

Figure 9:
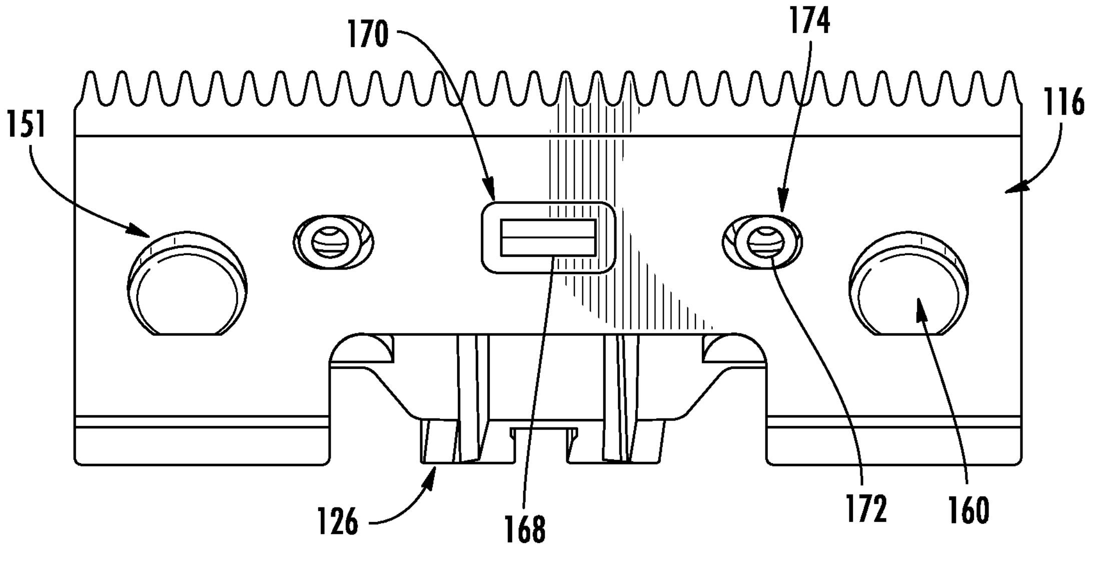
FIG. 9 is a bottom perspective view of a yoke and a cutting blade, according to an exemplary embodiment.

Referring to FIG. 9, a bottom perspective view of a yoke 126 coupled to cutting blade 116 is shown according to an exemplary embodiment. Yoke 126 includes a middle projection 168 extending downward (i.e., toward stationary blade 118). Middle projection 168 extends through and/or is received within a middle opening 170 of cutting blade 116. Yoke 126 further includes opposing side projections 172 extending downward (i.e., toward stationary blade 118). Opposing side projections 172 extend through and/ore are received within side openings or bore 174 in cutting blade 116. Side openings 174 are positioned on opposing sides of middle opening 170 and specifically between middle opening 170 and bores 151 that receive magnets 160.

Figure 10:
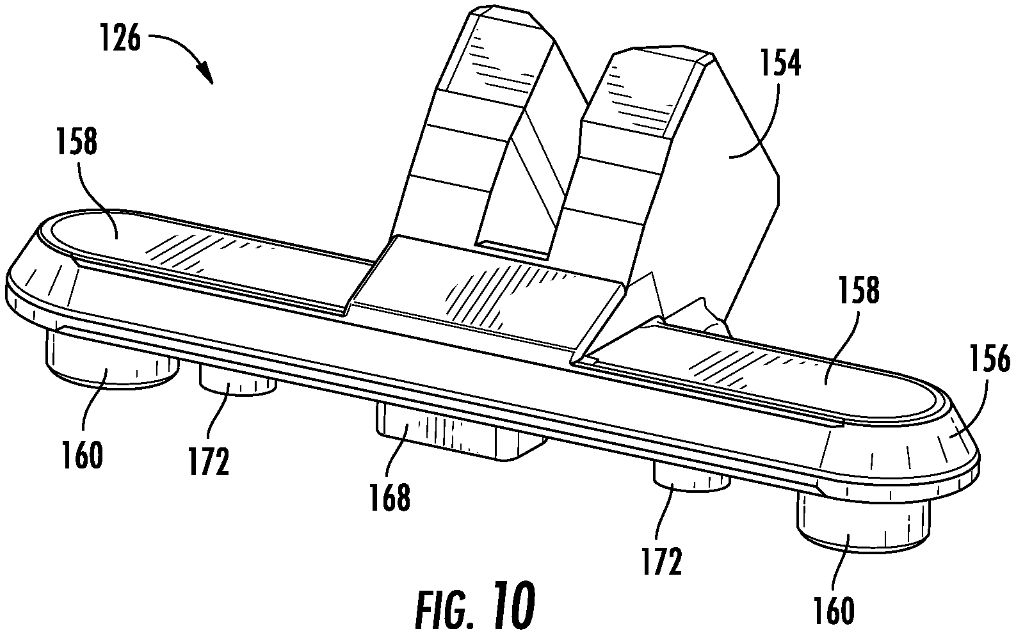
FIG. 10 is a front perspective view of the yoke, according to an exemplary embodiment.
Figure 11:
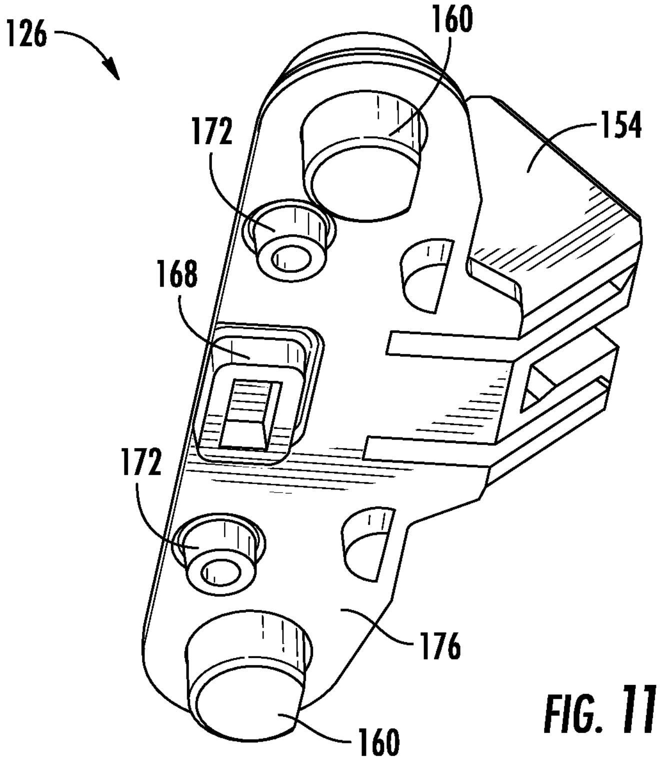
FIG. 11 is a bottom perspective view of the yoke of FIG. 10, according to an exemplary embodiment.

Referring to FIGS. 10-11, perspective views of yoke 126 are shown, according to an exemplary embodiment. Yoke 126 further includes a lower or downward facing surface 176 (i.e., toward stationary blade 118). Middle projection 168 and opposing side projections 172 extend from lower surface 176. In a specific embodiment, middle projection 168 has a generally rectangular shape. In other embodiments, middle projection 168 has a different shape (e.g., polygonal, circular, etc.). In another specific embodiment, opposing side projections 172 have a generally circular shape. In other embodiments, opposing side projections 172 have a different shape (e.g., polygonal, oval, rectangular etc.).

Figure 12:
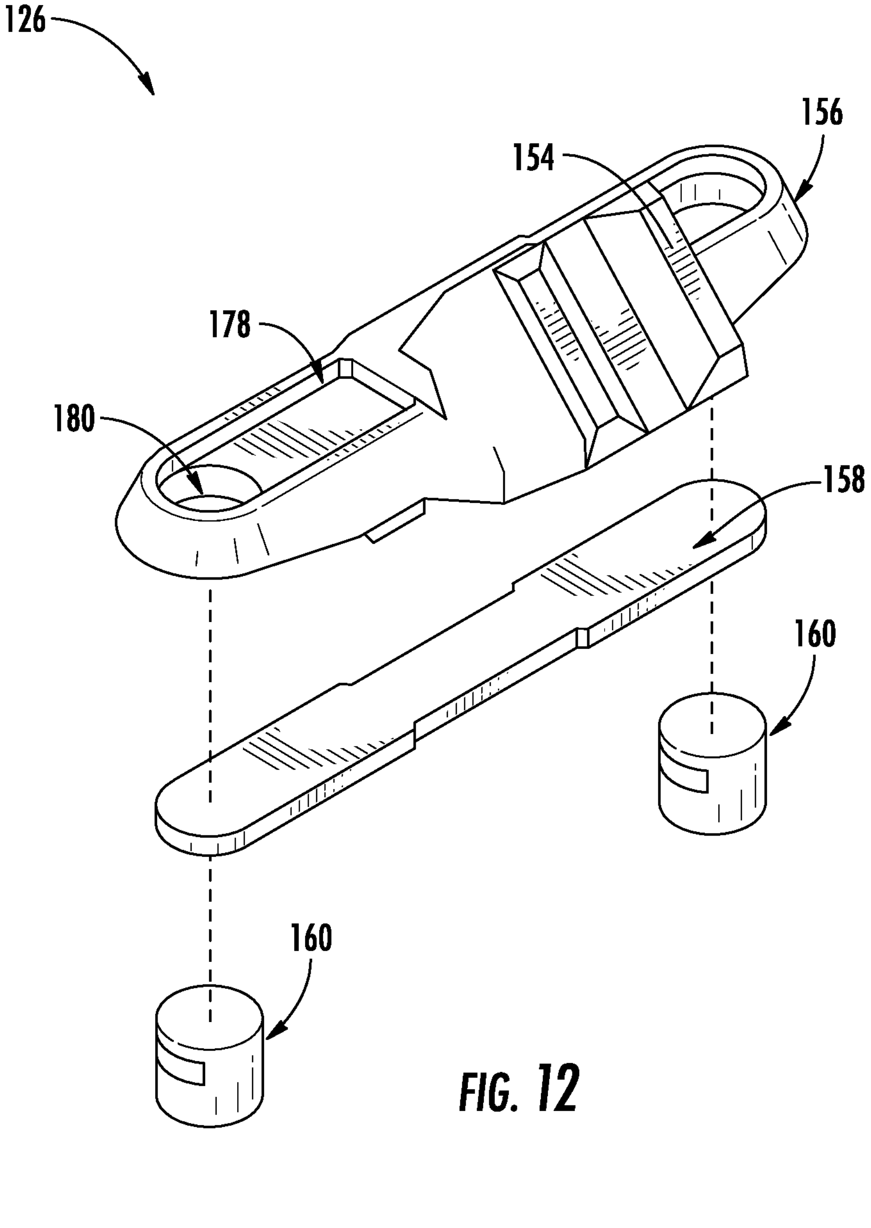
FIG. 12 is an exploded view of a magnetic tensioning assembly, according to an exemplary embodiment.

Referring to FIG. 12, an exploded view of yoke 126 and the magnetic tensioning assembly is shown according to an exemplary embodiment. Cross-portion 156 of yoke 126 includes recessed portions 178. Recessed portions 178 of the yoke 126 are configured to receive metal bar 158. Within recessed portions 178 is at least one through bore 180 to receive a portion of magnet 160. In a specific embodiment a pair of through bores 180 receive a portion of magnets 160 that are positioned below metal bar 158 when yoke 126 and the magnetic tensioning system is assembled.

FIGS. 13-19 illustrate another embodiment of a blade assembly 214 that can be utilized with a hair cutting device such as hair clipper 10. Blade assembly 214 includes an upper or cutting blade 216 and a lower or stationary blade 216. Blade assembly 214 is substantially the same or similar to the embodiment of blade assembly 14 shown in FIGS. 1-2 and/or blade assembly 114 shown in FIGS. 3-12, except for the differences described herein.

Figure 13:
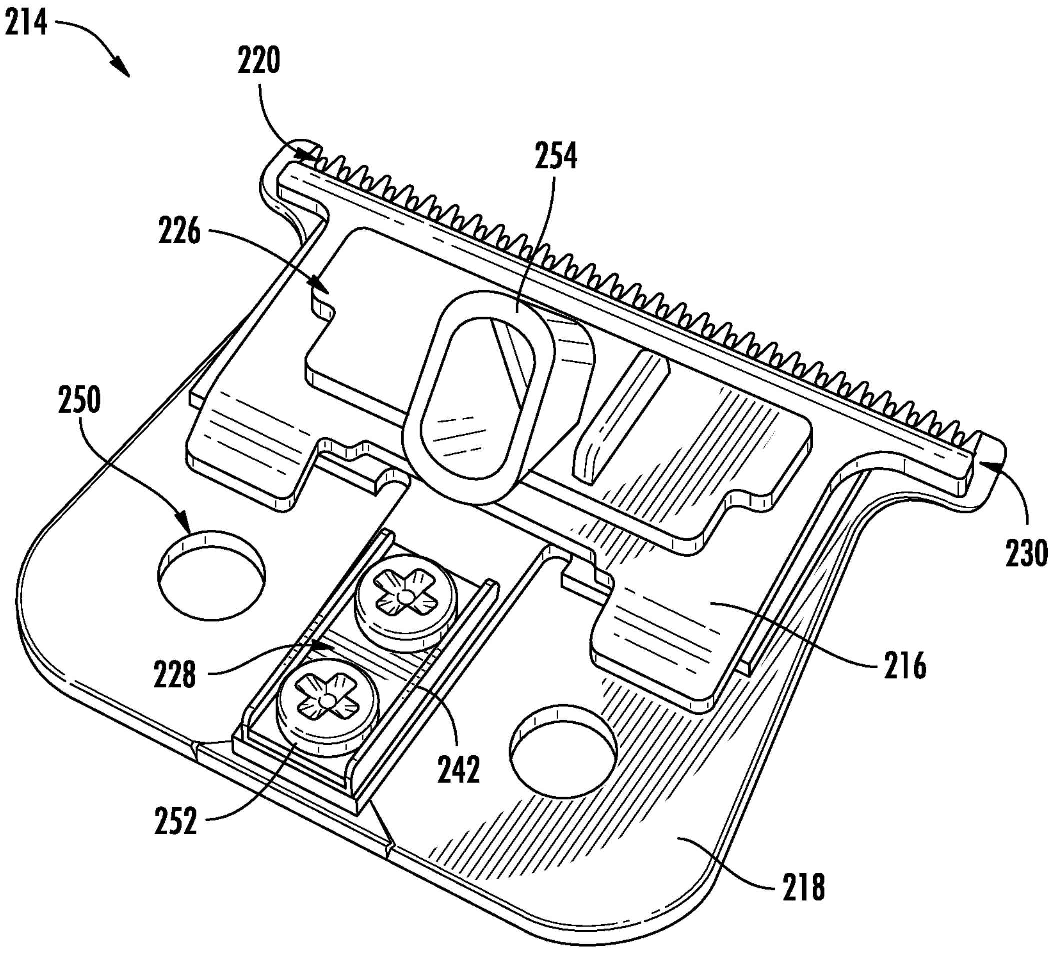
FIG. 13 is a top perspective view of a blade assembly, according to another exemplary embodiment.

Referring to FIG. 13, a top perspective view of blade assembly 214 is shown according to another exemplary embodiment. Cutting blade 216 has teeth 220 extending from a cutter blade edge and defining a first direction parallel to a width of the handle (see e.g., 12 in FIG. 1). As cutting blade 216 oscillates over stationary blade 218 in a first direction, the teeth 220 on cutting blade 216 and stationary blade 218 capture hair follicles and cooperate to cut hair. Stationary blade 218 has stationary teeth 230 extending from a second or stationary blade edge.

Yoke 226 includes an upper portion 254. Upper portion 254 of yoke 226 is configured to receive a portion of a drive shaft (see e.g., 31 in FIG. 2). Specifically, a recess 255 (see e.g., FIG. 14) is configured to engage with the drive shaft. Yoke 226 is fixedly coupled to cutting blade 216 and receives motor 28 output through the drive shaft. The movement of the drive shaft causes cutting blade 216 to oscillate over stationary blade 218.

The guide member 228 is mounted to the stationary blade 218 and includes a guide base or arm 242 and a cross-portion 236. In a specific embodiment, the blade assembly 214 further includes a washer including a pair of slots or openings extending parallel to the major axis of the guide arm 242 and perpendicular to the major axis of the cross-portion 236 that can be coupled to the guide member 228 using fasteners 252 (e.g., screws). Arm 242 is planar (i.e., flat) and does not include angled portion like arm 142.

The cross-portion 236 includes a guide edge parallel to the cutting blade 216 edge and/or the stationary blade 218 edge when the guide member 228 is installed on the stationary blade 218. The guide member 228 guides the reciprocating movement of the cutting blade 216 with the guide edge. In various embodiments where the blade assembly 214 includes a spring to apply a downward biasing force on the yoke 226, guide member 228 retains the spring against the stationary blade 218. In a specific embodiment, guide member 228 is T-Shaped. A pair of fastener holes 250 permit fasteners (e.g., screws) to pass through stationary blade 218 and fixedly couple stationary blade 218 to a blade assembly housing or handle 12 of a hair cutting device 10.

Figure 14:
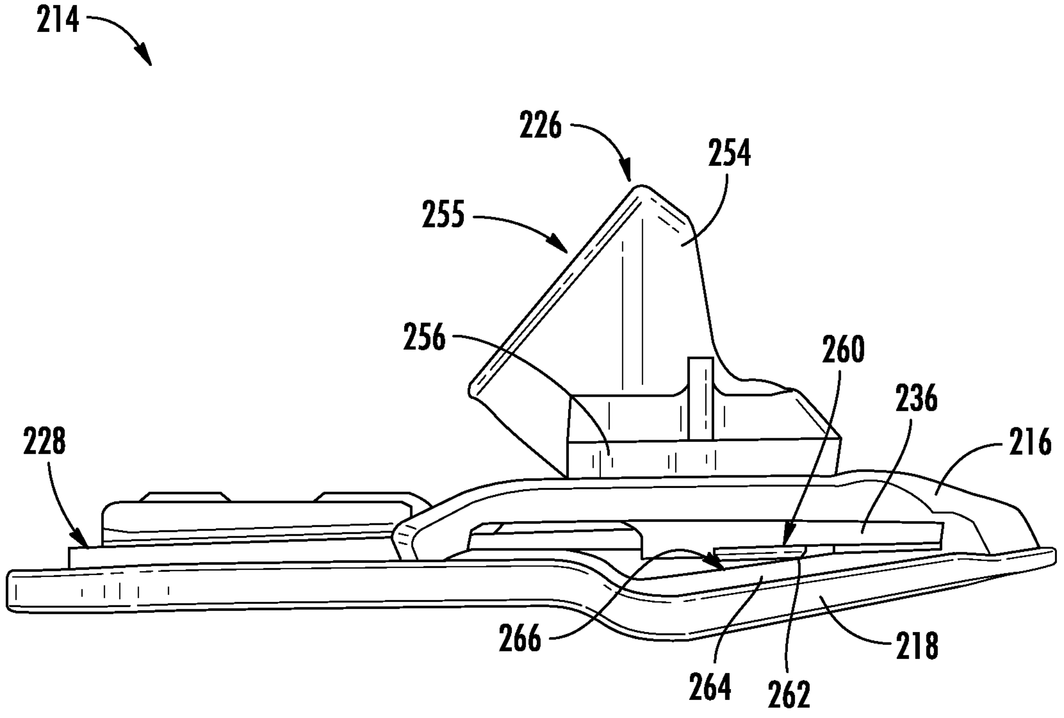
FIG. 14 is a side view of the blade assembly of FIG. 13, according to an exemplary embodiment.

Referring to FIG. 14, a side view of the blade assembly 214 of FIG. 13 is shown, according to an exemplary embodiment. Yoke 226 includes a body or cross-portion 256 extending in a generally parallel orientation to the cutter blade edge. Blade assembly 214 includes a magnetized ferromagnetic material and/or at least one magnet 260 positioned between yoke 226 and stationary blade 218. For example, yoke 226 is a non-conductive magnet carrier (e.g., a plastic yoke 226 carrying a magnet 260) or conductive magnetic material. In a specific embodiment, at least one magnet 160 is positioned within and/or coupled to yoke 226. In a specific embodiment a pair of magnets 260 are coupled to yoke 226. Magnets 260 extend through the cutting blade 216 and specifically bores 274 (see e.g., FIG. 15) toward stationary blade 218. In a specific embodiment, magnets 260 are rare earth magnets. In a specific embodiment, the magnets are formed from Neodymium. In such an embodiment, the Neodymium has a grade of N52.

Figure 15:
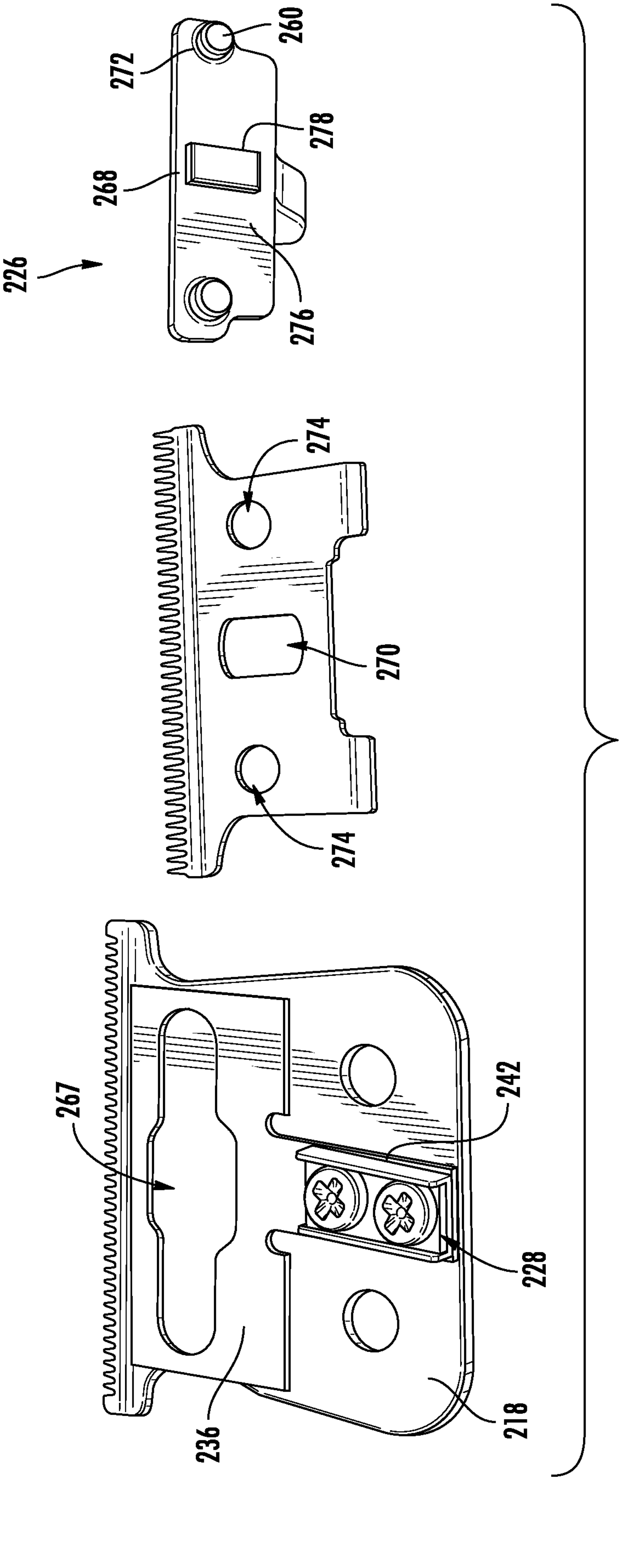
FIG. 15 is a partially exploded view of the blade assembly of FIG. 13, according to an exemplary embodiment.
Figure 16:
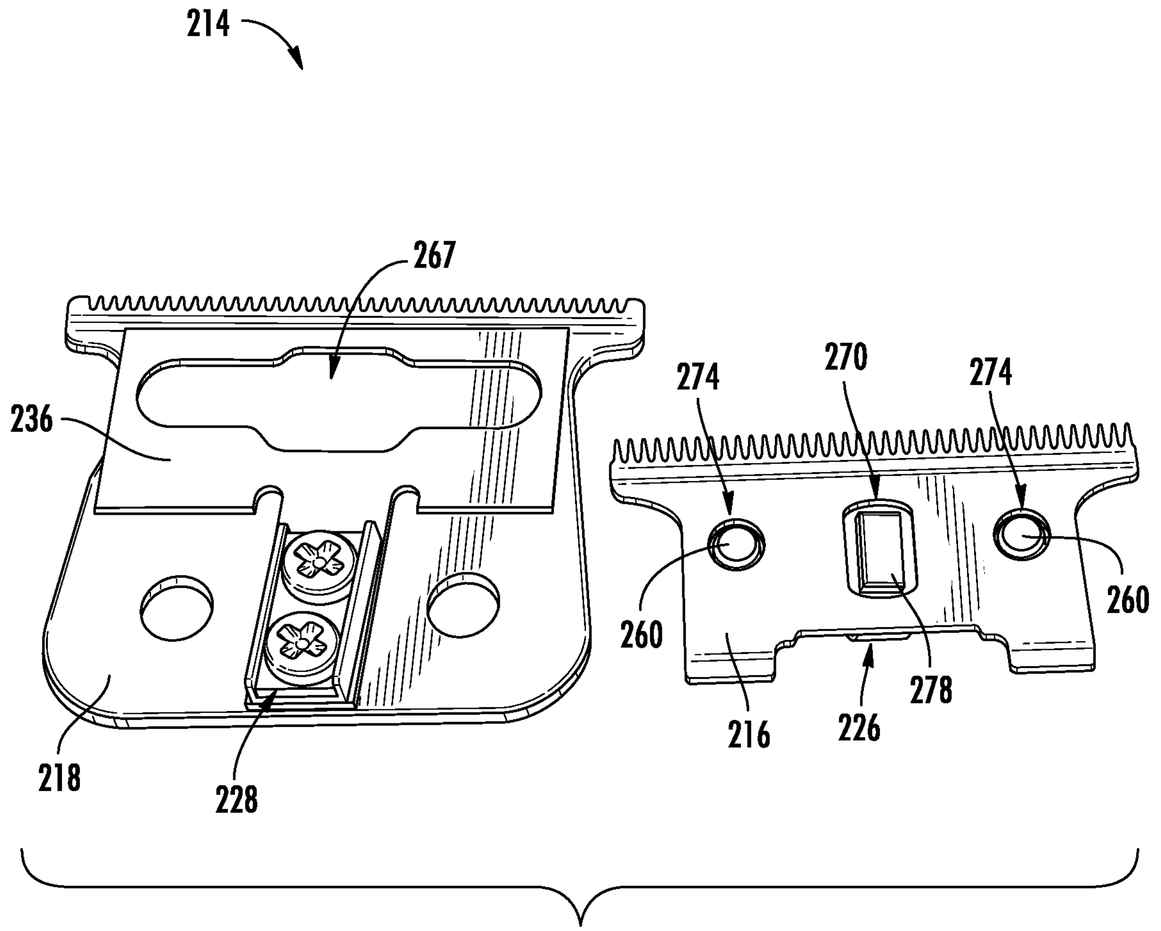
FIG. 16 is a partially exploded view of the blade assembly of FIG. 13, according to an exemplary embodiment.

Magnet 260 includes a lower surface 262 that faces an upper surface 264 of stationary blade 218. In a specific embodiment, a gap or space 266 is defined between lower surface 262 of magnet 260 and upper surface 264 of stationary blade 218. Applicant believes the tensioning force produced reduces friction and/or wear when gap 266 has a dimension or length D2. In a specific embodiment, D2 is between 0.005 and 0.02 inches and more specifically between 0.01 and 0.015 inches. Referring to FIGS. 15-16, partially exploded views of the blade assembly 214 of FIG. 13 are shown, according to an exemplary embodiment. The cross-portion 236 of guide member 228 includes an opening 267 extending through guide member 228. When the guide assembly 214 is assembled a portion of a magnetic tensioning assembly such as magnets 260 are positioned within and/or extend through the opening 267.

Yoke 226 includes a middle projection 268 extending downward (i.e., toward stationary blade 218). Middle projection 268 extends through and/or is received within a middle opening 270 of cutting blade 216. Yoke 226 further includes opposing side projections 272 extending downward (i.e., toward stationary blade 218). Opposing side projections 272 extend through and/or are received within side openings or bore 274 in cutting blade 216. Side openings 274 are positioned on opposing sides of middle opening 270 and receive magnets 260 when blade assembly 214 is assembled.

Yoke 226 further includes a lower or downward facing surface 276 (i.e., toward stationary blade 218). Middle projection 268 and opposing side projections 272 extend from lower surface 276. In a specific embodiment, middle projection 268 has a generally rectangular shape. In other embodiments, middle projection 268 has a different shape (e.g., polygonal, circular, etc.). In another specific embodiment, opposing side projections 272 have a generally circular shape. In other embodiments, opposing side projections 272 have a different shape (e.g., polygonal, oval, rectangular etc.).

Figure 17:
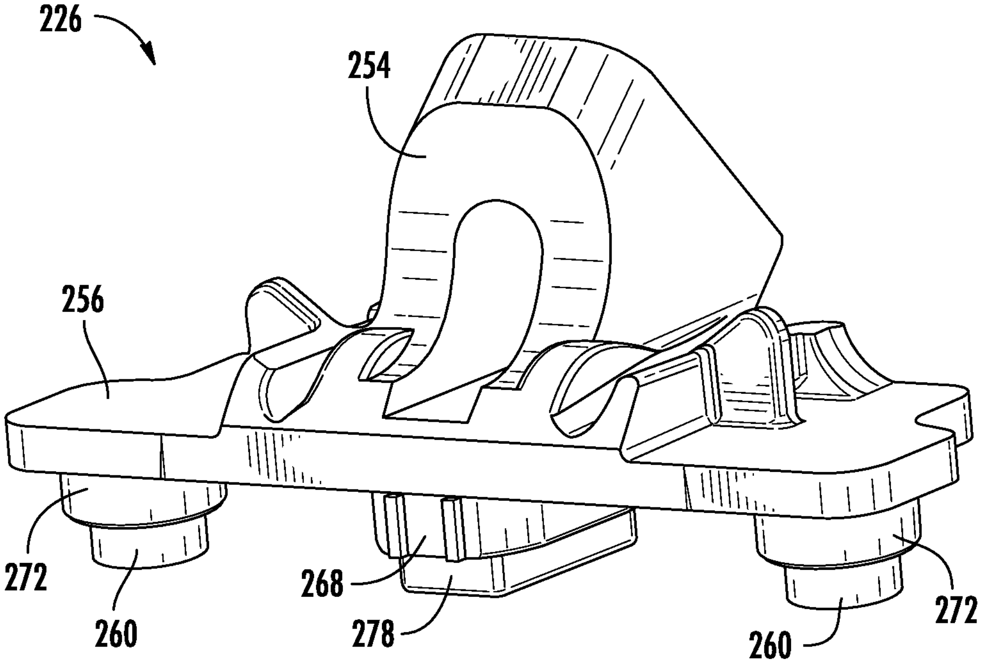
FIG. 17 is a front perspective view of a yoke of the blade assembly of FIG. 13, according to an exemplary embodiment.
Figure 18:
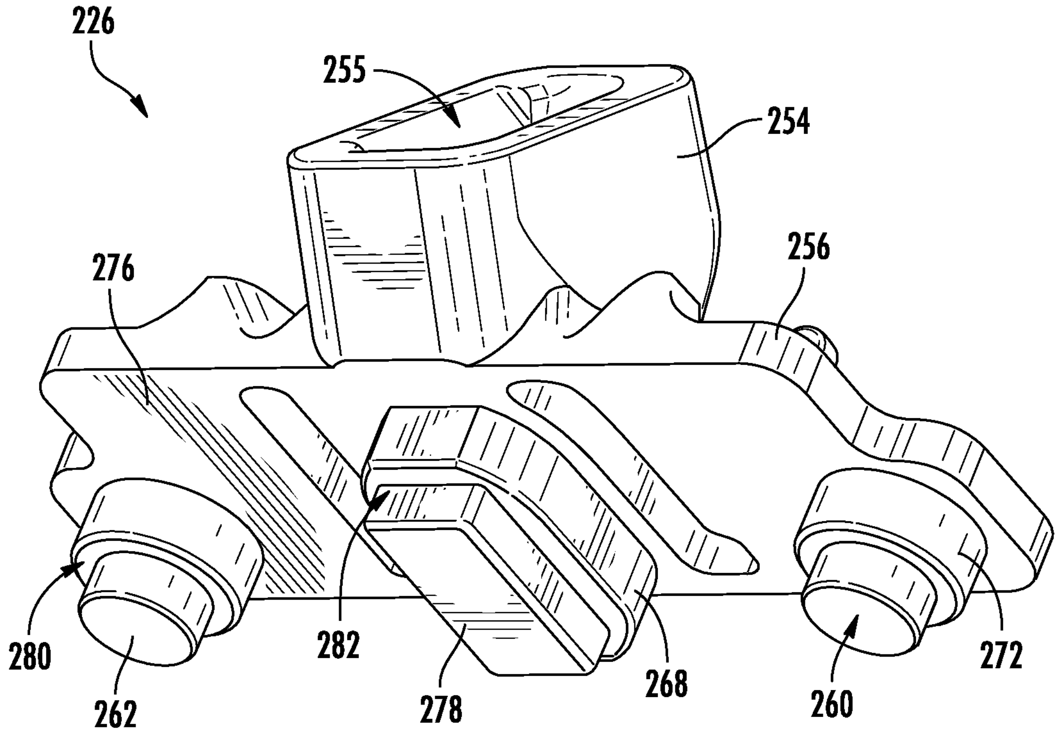
FIG. 18 is a bottom perspective view of the yoke of FIG. 17, according to an exemplary embodiment.

Referring to FIGS. 17-18, perspective view of yoke 226 including the magnetic tensioning assembly are shown, according to exemplary embodiments. Yoke 226 is coupled to a middle magnet 278. Middle magnet 278 is substantially the same as magnets 260 except for the differences discussed herein. In a specific embodiment, middle magnet 278 has a generally rectangular shape. In other embodiments, middle magnet 278 has a different shape (e.g., polygonal, circular, etc.). In a specific embodiment, middle magnet 278 has a greater size than a size of the magnet 260. Middle magnet 278 is received within and/or coupled to a recess 282 in middle projection 268. Magnets 260 are received and/or coupled to recesses 280 defined in side projections 272.

Figure 19:
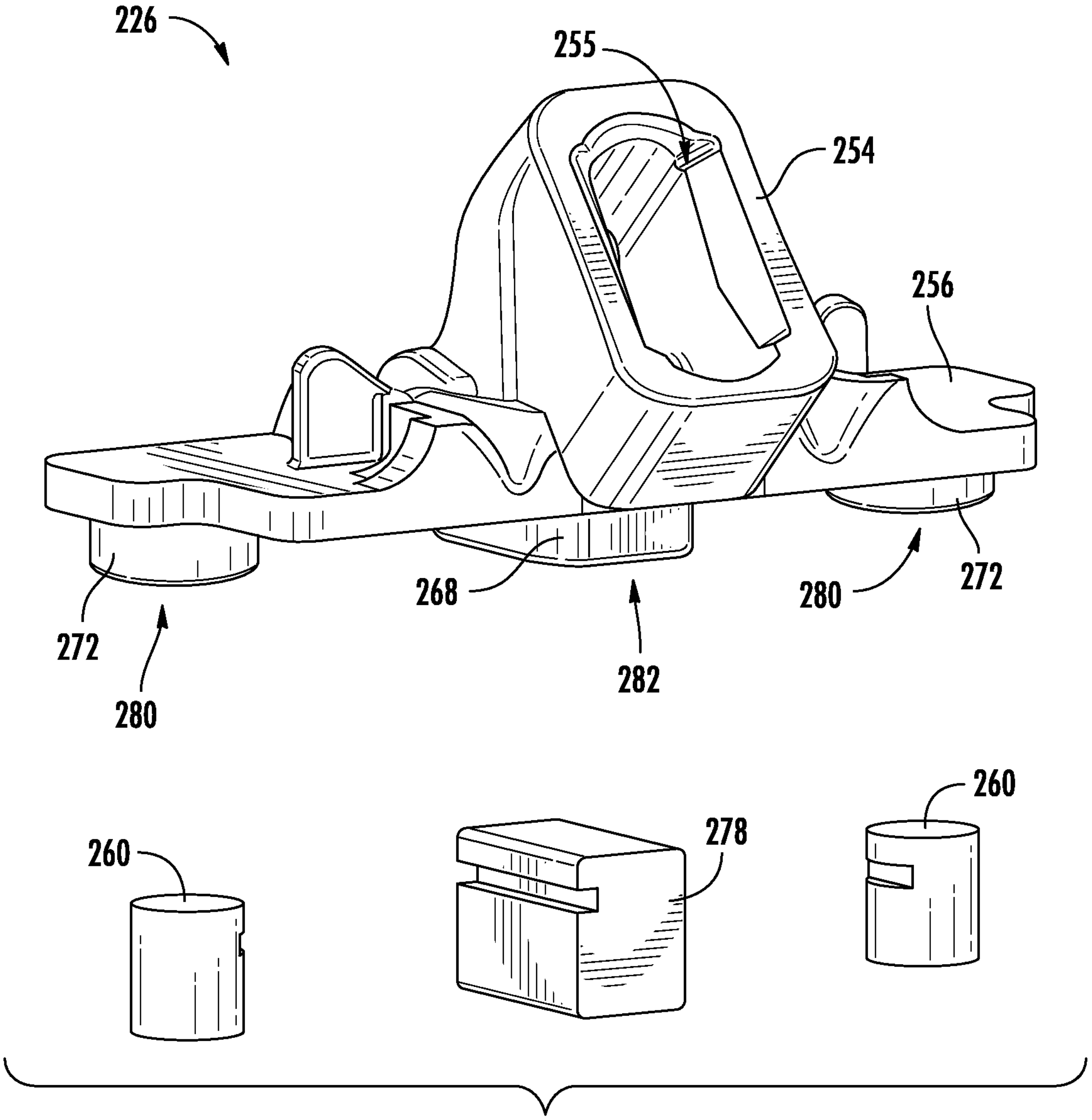
FIG. 19 is an exploded view of a magnetic tensioning assembly, according to an exemplary embodiment.

Referring to FIG. 19, an exploded view of yoke 226 is shown according to an exemplary embodiment. Magnets 260 and middle magnet 278 are sized such that a portion of magnets 260 and middle magnet 278 are at least partially received within yoke 226. At least a portion of magnets 260 and middle magnet 278 extend beyond a bottom or lowermost portion of opposing side projections 272 and middle projection 268, respectively.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A magnetic blade assembly, comprising:
- a stationary blade having teeth extending along a first blade edge;
- a cutting blade having cutting teeth extending along a second blade edge parallel to the first blade edge, and supported relative to the stationary blade such that the cutting teeth are moveable over the stationary blade to cut hair;
- a guide member including a base and a cross-portion, the cross-portion being captured between the stationary blade and the cutting blade; and
- a yoke coupled to the cutting blade, the yoke comprising:
  - a body extending in a parallel direction to the second blade edge;
  - a bore defined by the body;
  - a magnet coupled to the body of the yoke and received within the bore; and
  - a metal bar coupled to the yoke and positioned within a recessed portion of the yoke;
- wherein the magnet is positioned between the metal bar and the cutting blade;
- wherein the magnet comprises a pair of magnets coupled to the body of the yoke and positioned below the metal bar such that a magnetic circuit is created;
- wherein the yoke is plastic; and
- wherein the pair of magnets generate a tensioning force between the cutting blade and the stationary blade.

2. The magnetic blade assembly of claim 1, wherein one of the pair of magnets includes a first end having a positive pole adjacent to the stationary blade and a second end having a negative pole adjacent to the yoke and wherein the second of the pair of magnets includes a first end having a negative pole adjacent to the stationary blade and a second end having a positive pole adjacent to the yoke.

3. The magnetic blade assembly of claim 1, wherein the metal bar is formed from steel.

4. The magnetic blade assembly of claim 1, wherein the pair of magnets are rare earth magnets.

5. The magnetic blade assembly of claim 1, wherein the base of the guide member is substantially perpendicular to second blade edge and wherein a portion of the base extends at an angle relative to the stationary blade.

6. The magnetic blade assembly of claim 1, wherein a distance between the first blade edge and the second blade edge defines a blade gap, and wherein, when an inner section of the cross-portion of the guide member engages the cutting blade to translate the cutting blade over the stationary blade, the translation of the cutting blade controls the blade gap.

7. A magnetic blade assembly, comprising:
- a first blade having teeth extending along a first blade edge;

- a second blade having teeth extending along a second blade edge parallel to the first blade edge and supported relative to the first blade;
- a blade guide assembly captured between the first blade and the second blade, the blade guide assembly maintaining a relative position of the first blade edge relative to the second blade edge, the blade guide assembly comprising:
  - a guide member including a base and a cross-portion, the cross-portion being captured between the first blade and the second blade, the cross-portion having a first side facing the first blade and a second side facing the second blade;
- a yoke coupled to the second blade, the yoke comprising a body extending in a parallel direction to the second blade edge and a bore defined by the body;
- a magnet positioned between the yoke and the second blade and received within the bore; and
- a metal bar coupled to the yoke, wherein the magnet is positioned below the metal bar and between the metal bar and the second blade;
- wherein the magnet comprises a pair of magnets coupled to the body of the yoke and extending toward the first blade;
- wherein the yoke is plastic; and
- wherein the pair of magnets generate a tensioning force between the second blade and the first blade.

8. The magnetic blade assembly of claim 7, wherein the metal bar is positioned above the pair of magnets such that a magnetic circuit is created.

9. The magnetic blade assembly of claim 8, wherein one of the pair of magnets includes a first end having a positive pole adjacent to the first blade and a second end having a negative pole adjacent to the yoke and wherein the other of the pair of magnets includes a first end having a negative pole adjacent to the first blade and a second end having a positive pole adjacent to the yoke.

10. The magnetic blade assembly of claim 7, wherein a distance between the first blade edge and the second blade edge defines a blade gap.

11. The magnetic blade assembly of claim 10, wherein an inner section of the cross-portion of the guide member engages the second blade to translate the second blade over the first blade and wherein translation of the second blade controls the blade gap.

12. A magnetic blade assembly, comprising:
- a first blade having teeth extending along a first blade edge;
- a second blade having teeth extending along a second blade edge parallel to the first blade edge and supported relative to the first blade;
- a guide member positioned between the first blade and the second blade;
- a yoke coupled to the second blade, the yoke comprising a body extending in a parallel direction to the second blade edge and a bore defined by the body; and
- a magnet coupled to the yoke and received within the bore;
- wherein at least a portion of the magnet extends through a second bore defined within the second blade, the second bore extending from a first surface of the second blade to a second surface of the second blade, and wherein the magnet generates a tensioning force between the second blade and the first blade; and
- wherein the magnet comprises two magnets and a metal bar coupled to the yoke, the two magnets are positioned between the metal bar and the second blade, and wherein the yoke is plastic.

13. The magnetic blade assembly of claim 12, wherein the metal bar extends along an upward facing surface of the body of the yoke in a direction parallel to the second blade edge.

14. The magnetic blade assembly of claim 12, wherein a positive pole of one of the two magnets is positioned adjacent to the metal bar and wherein a negative pole of the remaining magnet is posited adjacent to the metal bar.

15. The magnetic blade assembly of claim 12, wherein each of the two magnets includes a lower surface that faces an upper surface of the first blade and wherein a gap is defined between the lower surface of each magnet and the upper surface of the first blade.

16. The magnetic blade assembly of claim 15, wherein a length of the gap is between .005 and .02 inches.

17. The magnetic blade assembly of claim 12, wherein the first surface of the second blade extends from the second blade edge and faces away from the first blade, and wherein the second surface of the second blade faces the first blade.

* * * * *